(12) United States Patent
Fujimura

(10) Patent No.: US 6,807,236 B1
(45) Date of Patent: Oct. 19, 2004

(54) CROSSTALK ELIMINATION METHOD AND SYSTEM

(75) Inventor: Masaya Fujimura, Tokyo (JP)

(73) Assignee: NEC Corporation, Tokyo (JP)

( * ) Notice: Subject to any disclaimer, the term of this patent is extended or adjusted under 35 U.S.C. 154(b) by 578 days.

(21) Appl. No.: 09/644,043

(22) Filed: Aug. 23, 2000

(30) Foreign Application Priority Data

Aug. 23, 1999 (JP) .......................................... 11/235028

(51) Int. Cl.[7] .......................................... H04B 15/00
(52) U.S. Cl. ...................... 375/285; 375/257; 370/201
(58) Field of Search ............................... 375/260, 285, 375/257, 296, 371, 346, 373, 360, 349, 375, 376, 326, 327; 370/201, 516, 518, 519

(56) References Cited

U.S. PATENT DOCUMENTS

| | | | | |
|---|---|---|---|---|
| 4,281,409 A | * | 7/1981 | Schneider | 370/201 |
| 5,271,037 A | * | 12/1993 | Szechenyi | 375/259 |
| 5,887,032 A | * | 3/1999 | Cioffi | 375/257 |
| 6,259,745 B1 | * | 7/2001 | Chan | 375/285 |
| 6,307,906 B1 | * | 10/2001 | Tanji et al. | 375/376 |
| 6,385,252 B1 | * | 5/2002 | Gradl et al. | 375/257 |

FOREIGN PATENT DOCUMENTS

| | | |
|---|---|---|
| JP | 10041981 | 2/1998 |
| WO | 99/12316 | 3/1999 |

OTHER PUBLICATIONS

Noriyoshi Itazaki et al., "A Fault Simulation Method for Crosstalk Faults in Synchronous Sequential Circuits," IEICE Transactions on Information and Systems, Institute of Electronics Information and Comm. Eng., Tokyo, Japan, V. E80–D, pp. 38–43.

* cited by examiner

Primary Examiner—Khai Tran
Assistant Examiner—Khanh Cong Tran
(74) Attorney, Agent, or Firm—Young & Thompson (57) ABSTRACT

A crosstalk elimination system allowing the reduced number of cables and a downsizing of transmission equipment is disclosed. A sending equipment includes a detector for detecting a possible crosstalk timing in each of the data signals by comparing phases of the clock signals to transmit it to the receiving equipment. A receiving equipment includes a read timing shifter for shifting a read timing of each of the clock signals associated with a corresponding data signal to a no-crosstalk timing determined based on the possible crosstalk timing.

11 Claims, 10 Drawing Sheets

CROSSTALK ELIMINATION METHOD AND SYSTEM

BACKGROUND OF THE INVENTION

1. Field of the Invention

The present invention relates to a crosstalk elimination method and system for use in a transmission system that transmits a plurality of pairs of a data signal and a clock signal thereof.

2. Description of the Related Art

In the case of a plurality of transmission lines that are close together, crosstalk occurs when magnetic fields or current from nearby transmission lines interrupt electrical currents in a transmission line. Since crosstalk causes data error and transmission error, it is very important to effectively eliminate crosstalk from the transmission system.

A simple but effective crosstalk elimination method is to transmit a plurality of pairs of data and clock signals through different cables. Since the pairs of data and clock signals are properly separated from each other, such a conventional system effectively eliminates crosstalk even In the case where these data signals are not synchronized.

However, the conventional transmission system needs as many cables as the pairs of data and clock signals. Therefore, laying cables should be done with caution not to generate crosstalk, resulting in a difficult pattern design. Further, it is difficult to downsize transmission equipment in the event a large number of pairs of data and clock signals are to be transmitted.

SUMMARY OF THE INVENTION

An object of the present invention is to provide a crosstalk elimination method and system that reduces number of cables and permits downsizing of transmission equipment.

Another object of the present invention is to provide crosstalk elimination method and system allowing a stable and reliable transmission system with simplified cabling.

According to the present invention, in a system for eliminating crosstalk among a plurality of data signals traveling from sending equipment to receiving equipment through a transmission cable, clock signals and their associated data signals are not synchronized with each other.

The sending equipment includes a detector for detecting a possible crosstalk timing in each of the data signals by comparing phases of the clock signals to transmit it to the receiving equipment. The receiving equipment includes a read timing shifter for shifting a read timing of each of the clock signals associated with a corresponding data signal to a no-crosstalk timing determined based on the possible crosstalk timing.

The detector may include: a leading edge detestor for detecting a leading edge timing of each of the clock signals; a trailing edge detector for detecting a trailing edge timing of the clock signal; and a crosstalk timing detector for detecting the possible crosstalk timing in a corresponding data signal based on the trailing edge timing of the clock signal associated with it and leading edge timings of all clock signals other than the clock signal.

The receiving equipment may further include: a first data reading section for reading each of the data signals received from the sending equipment according to the no-crosstalk timing to produce a first data signal; and a second data reading section for reading the first data signal according to the read timing of a corresponding clock signal.

As an embodiment of the present invention, the sending equipment may include a phase comparator for comparing phases of the clock signals to produce a phase shift trigger signal indicating a possible crosstalk timing for each of the data signals, to transmit the phase shift trigger signal to the receiving equipment. The receiving equipment may include: a read timing shifter for receiving the phase shift trigger signal and a corresponding clock signal and shifting a read timing of the corresponding clock signal depending on the phase shift trigger signal to produce a shifted read timing signal: and a data reading section for receiving the data signal, the corresponding clock signal, and the shifted read timing signal, and reading the data signal according to the shifter read timing signal to produce a first data signal and thereafter reading the first data signal according to the corresponding clock signal to produce a final data signal.

The phase comparator may include: a leading edge detector for detecting a leading edge timing of each of the clock signals; a trailing edge detector for detecting a trailing edge timing of the clock signal; a crosstalk timing detector for detecting the possible crosstalk timing in a corresponding data signal based on the trailing edge timing of the clock signal associated with it and leading edge timings of all clock signals other than the clock signal; and a trigger generator for generating the phase shift trigger signal from the possible crosstalk timing, wherein the phase shift trigger signal has a pulse width having the possible crosstalk timing located therein.

The read timing shifter may include a selector for selecting one of the corresponding clock signal and a fixed signal being a logic high level depending on the phase shift trigger signal, wherein the corresponding clock signal is selected when the phase shift trigger signal is a logic low level and the fixed signal is selected when the phase shift trigger Signal is a logic high level.

The data reading section may include a first flip-flop circuit for reading the data signal according to the shifted read timing signal to produce the first data signal; and a second flip-flop circuit for reading the first data signal according to the corresponding clock signal.

As described above, according to the present invention, crosstalk among a plurality of data signals can be effectively removed. Therefore, a reliable and stable transmission system can be achieved. Further, the plurality of data signals can be transmitted as a bundle through a single cable, resulting in the reduced number of cables and a downsizing of the transmission system. This causes the design of cabling to be simplified and its cost to be reduced.

DETAILED DESCRIPTION OF THE PREFERRED EMBODIMENTS

Figure 1:
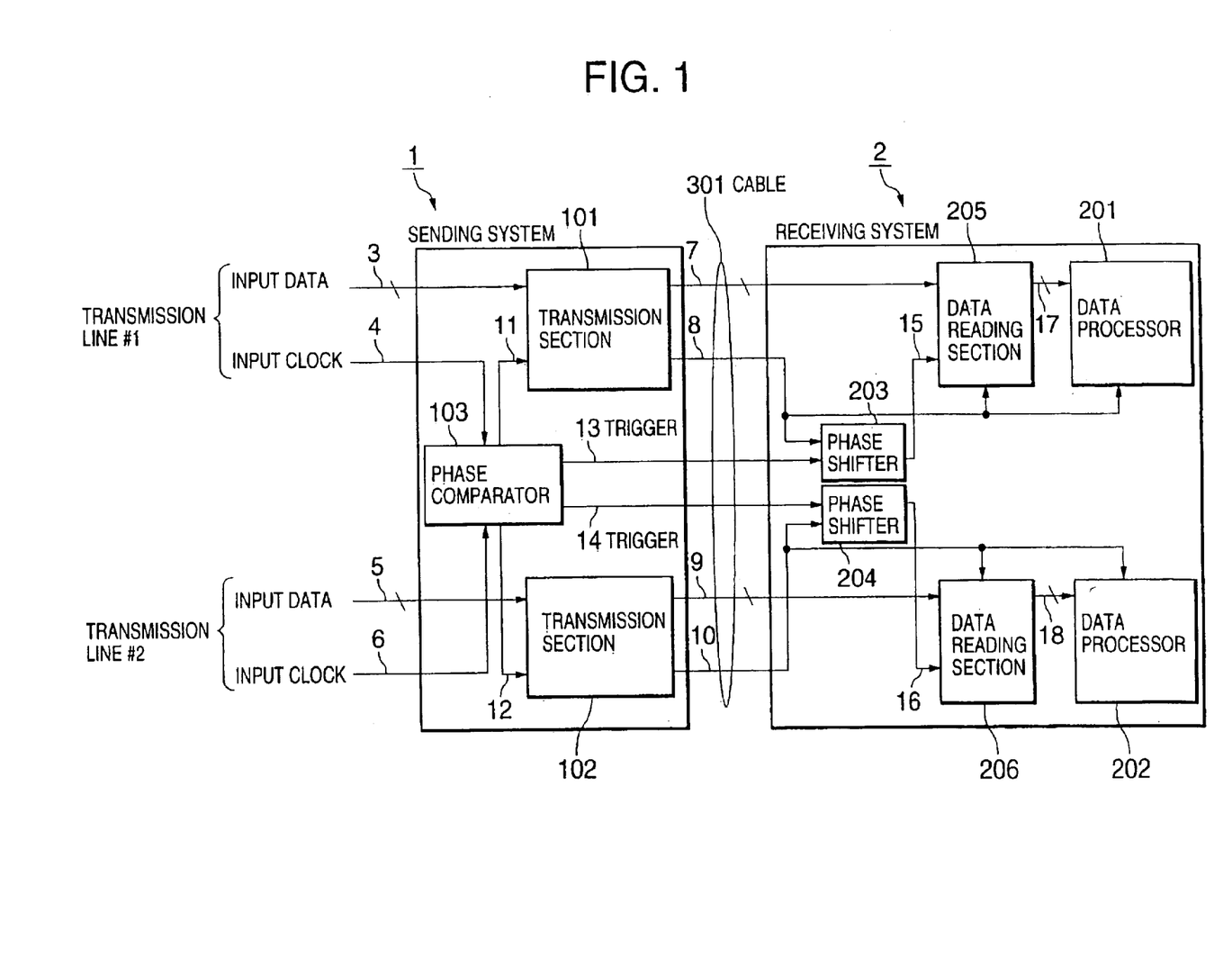
FIG. 1 is a block diagram showing a transmission system employing a crosstalk elimination system according to an embodiment of the present invention.

Referring to FIG. 1. it is assumed for simplicity that a transmission system composed of a sending system and a receiving system 2, which are connected by a single cable 301. The sending system 1 receives a plurality of pairs of data and clock signals, which are not synchronized to each other.

Here, the sending system 1 includes a transmission section 101, a transmission section 102, and a phase comparator 103. The sending system 1 receives a first pair of a data signal 3 and a clock signal 4 through a first transmission line and a second pair of a data signal 5 and a clock signal 6 through a second transmission line.

The transmission sections 101 and 102 receive the input data signals 3 and 5 and clock signals 11 and 12 that are received from the phase comparator 103, and transmits a pair of a data signal 7 and a clock signal 8 corresponding to the first pair and a pair of a data signal 9 and a clock signal 10 corresponding to the second pair.

The phase comparator 103 compares the clock signals 4 and 6 to produce monostable trigger signals 13 and 14 each indicating possible crosstalk timings, at which crosstalk may be generated at the receiving system 2. More specifically, the trigger signal 13 indicates the timing of possible crosstalk from the data signal 9 to the data signal 7 and the trigger signal 14 indicates the timing of possible crosstalk from the data signal 7 to the data signal 9. The details of the phase comparator 103 will be described later.

The sending system 1 transmits a pair of the data signal 7 and the clock signal 8, a pair of the data signal 9 and the clock signal 10, and the trigger signals 13 and 14 to the receiving system 2 through the cable 301. Here, the clock signals 4 and 6 are not synchronized and both clock frequencies are low. The clock signals 8 and 10 are also not synchronized and both clock frequencies are low.

The receiving system 2 includes data processors 201 and 202, phase shifters 203 and 204, and data reading sections 205 and 206. The phase shifter 203 receives the clock signal 8 and the trigger signal 13 indicating the timing of possible crosstalk from the data signal 9 to the, data signal 7. When the trigger signal 13 is output, the phase shifter 203 shifts the phase of the clock signal 8 to the timing at which no crosstalk could be generated to produce a reading clock signal 15. As described later, the amount of the time shift is determined depending on the pulse width of the trigger signal 13. When the trigger signal 13 is not output, the phase shifter 203 outputs the clock signal 8 as the reading clock signal 15. The data reading section 205 reads a first data signal from the data signal 7 according to the reading clock signal 15 having the timing at which no crosstalk could be generated. Thereafter, the data reading section 205 further reads a second data signal 17 from the first data signal according to the clock signal 8 for synchronization with the clock signal 8.

Similarly, the phase shifter 204 receives the clock signal 10 and the trigger signal 14 indicating the timing of possible crosstalk from the data signal 7 to the data signal 9. When the trigger signal 14 is output, the phase shifter 204 shifts the phase of the clock signal 10 to the timing at which no crosstalk could be generated to produce a reading clock signal 16. As described later, the amount of the time shift is determined depending on the pulse width of the trigger signal 14. When the trigger signal 14 is not output, the phase shifter 204 outputs the clock signal 10 as the reading clock signal 16. The data reading section 206 reads a first data signal from the data signal 9 according to the reading clock signal 16 having the timing at which no crosstalk could be generated. Thereafter, the data reading section 206 further reads a second data signal 18 from the first data signal according to the clock signal 10 for synchronization with the clock signal 10.

The respective data processor 201 and 202 process the data signals 17 and 18 output from the data reading sections 205 and 206.

Figure 2:
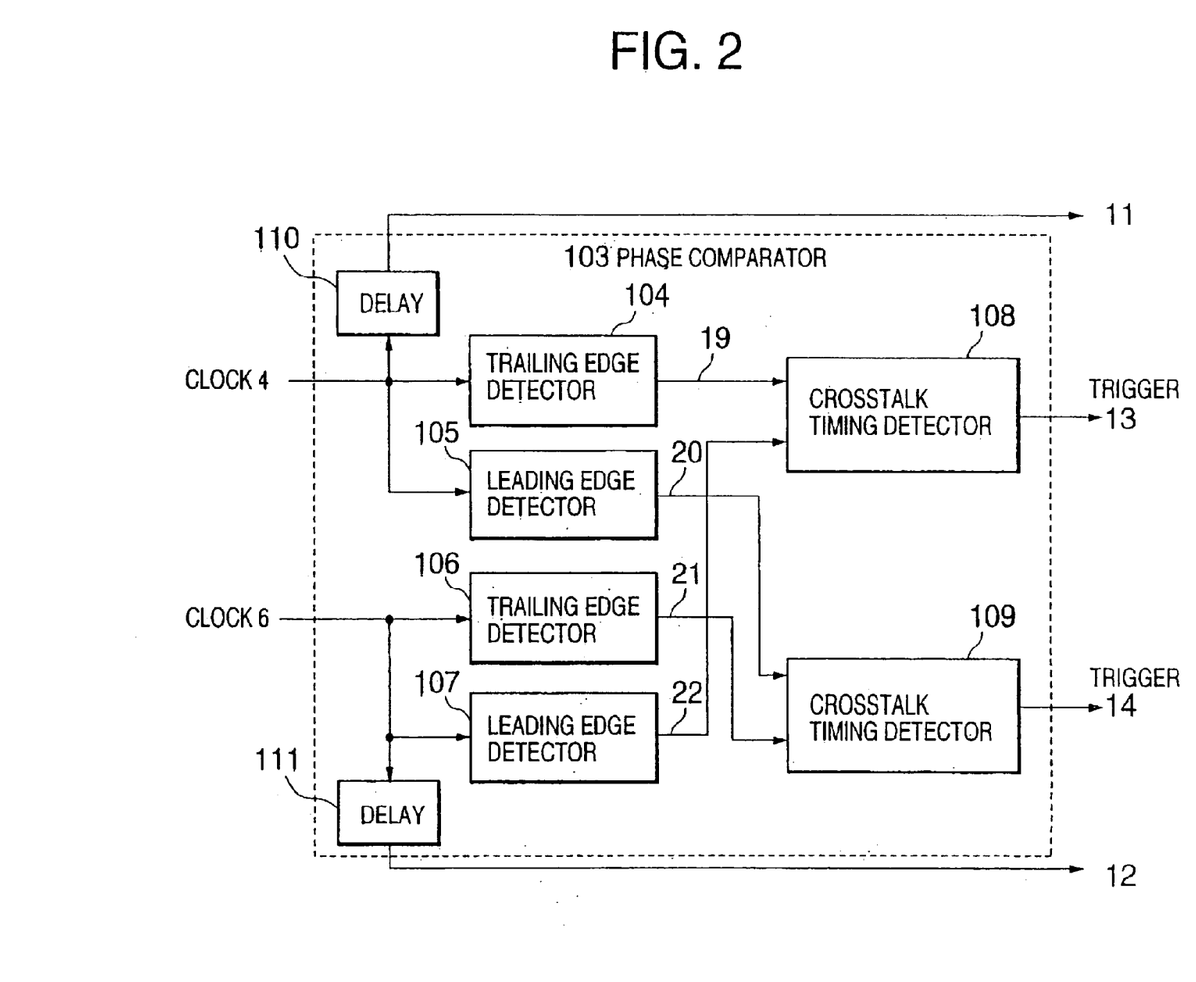
FIG. 2 is a schematic block diagram showing a phase comparator used in the embodiment of FIG. 1.

Referring to FIG. 2, the phase comparator 103 is provided with a trailing edge detector 104 and a leading edge detector 105, which detect the trailing edges and leading edges of the clock signal 4, respectively, and a trailing edge detector 106 and a leading edge detector 107, which detect the trailing edges and leading edges of the clock signal 6, respectively. The trailing edge timing of the clock signal 4 detected by the trailing edge detector 104 and the leading edge timing of the clock signal 6 detected by the leading edge detector 107 are output to a crosstalk timing detector 108. The trailing edge timing of the clock signal 6 detected by the trailing edge detector 106 and the leading edge timing of the clock signal 4 detected by the leading edge detector 105 are output to a crosstalk timing detector 109.

In the present embodiment, a data signal changes in synchronization with the trailing edge timing of its clock signal. Therefore, when one of the clock signals 4 and 6 goes low before and after the other goes high, crosstalk is likely to occur. The crosstalk timing detector 108 detects a possible crosstalk timing in the data signal 7 to produce the trigger signal 13. Similarly, the crosstalk timing detector 109 detects a possible crosstalk timing in the data signal 9 to produce the trigger signal 14.

As described later, each of the trailing edge detectors 104 and 106 and the leading edge detectors 105 and 107 includes a delay circuit for delaying the corresponding input clock signal by a predetermined amount. Therefore, the clock signal 4 is delayed by a delay circuit 110 and the delayed clock signal 11 is output to the transmission section 101. Similarly, the clock signal 6 is delayed by a delay circuit 111 and the delayed clock signal 12 is output to the transmission section 102. Therefore, the delayed clock signals 11 and 12 are transmitted as the clock signals 8 and 10 through the cable 301, respectively.

CROSSTALK ELIMINATION OPERATION

A crosstalk elimination operation in the data signal 7 according to the embodiment will be described with reference to FIG. 3.

Figure 3:
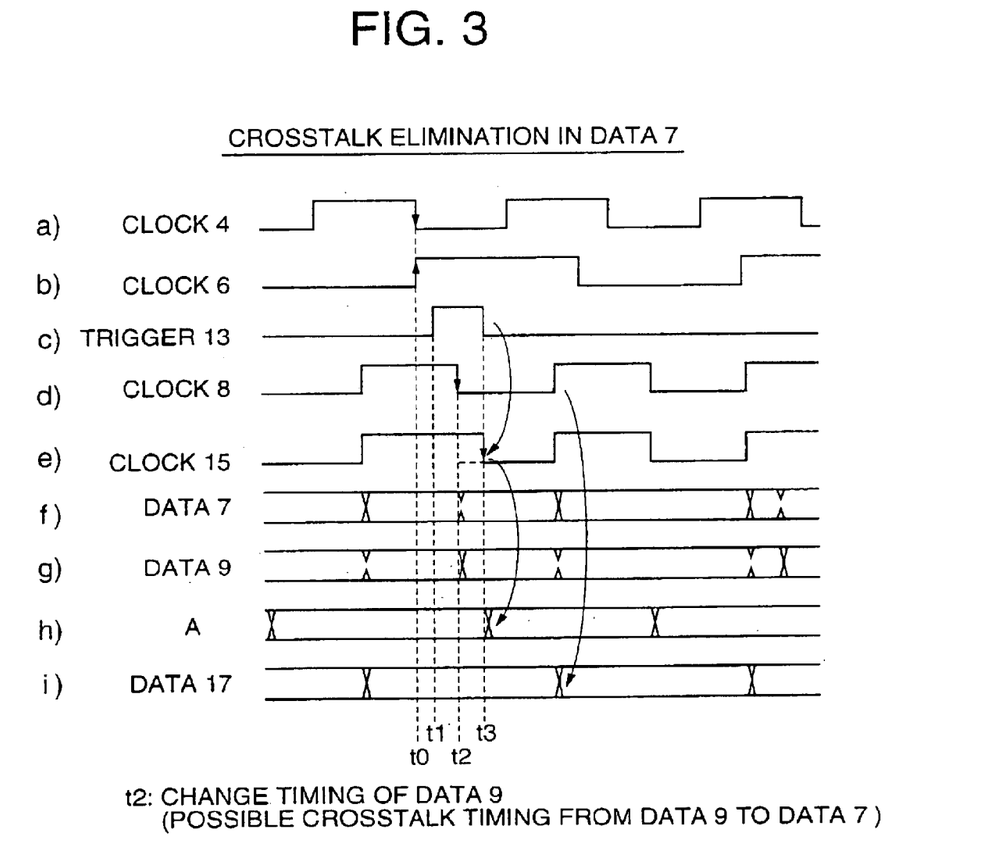
FIG. 3 is a time chart showing a first operation of the embodiment.

Referring to FIG. 3, it is assumed that the clock signal 4 goes low and the clock signal 6 goes high at time instant to. In this case, if no crosstalk elimination were made, then, at the receiving system 2, the data signal 7 would be read at the trailing edge timing t2 of the clock signal 8. However, the trailing edge timing t2 of the clock signal 8 is also the leading edge timing of the clock signal 10 corresponding to the clock signal 6. Therefore, the data signal 9 would interfere with the data signal 7 at the timing t2.

The crosstalk timing detector 108 of the phase comparator 103 detects possible crosstalk timing from the trailing edge timing 19 of the clock signal 4 detected by the trailing edge detector 104 and the leading edge timing 22 of the clock signal 6 detected by the leading edge detector 107. The crosstalk timing detector 108 outputs the trigger signal 13 having a pulse width (t1–t3) having the trailing edge timing t2 of the clock signal 8 located therein.

At the receiving system 2, the phase shifter 203 receives the clock signal 8 and the trigger signal 13. If the trigger signal 13 is in a logic level of "0", then the received clock signal 8 is supplied as a reading clock signal 15 to the data reading section 205 because no crosstalk occurs. If the trigger signal 13 is in a logic level of "1", which means that crosstalk may occur, then the phase shifter 203 shifts the trailing edge of the clock signal 8 to the trailing edge timing of the trigger signal 13 to produce a reading clock signal 15 as shown in (c) through (e) of FIG. 3. The trailing edge timing of the trigger signal 13 is located before the corresponding data signal changes. Therefore, the reading clock signal 15 produced by the phase shifter 203 always has the read timing at which no crosstalk occurs.

The data reading section 205 reads a first data signal indicated by reference symbol "A" from the data signal 7 according to the timing of the reading clock signal 15 as shown (h) of FIG. 3. Thereafter, the data reading section 205 further reads a second data signal 17 from the first data signal A according to the original timing of the clock signal 8 for synchronization with the clock signal 8 as shown in (i) of FIG. 3.

Next, a crosstalk elimination operation in the data signal 9 according to the embodiment will be described with reference to FIG. 4.

Figure 4:
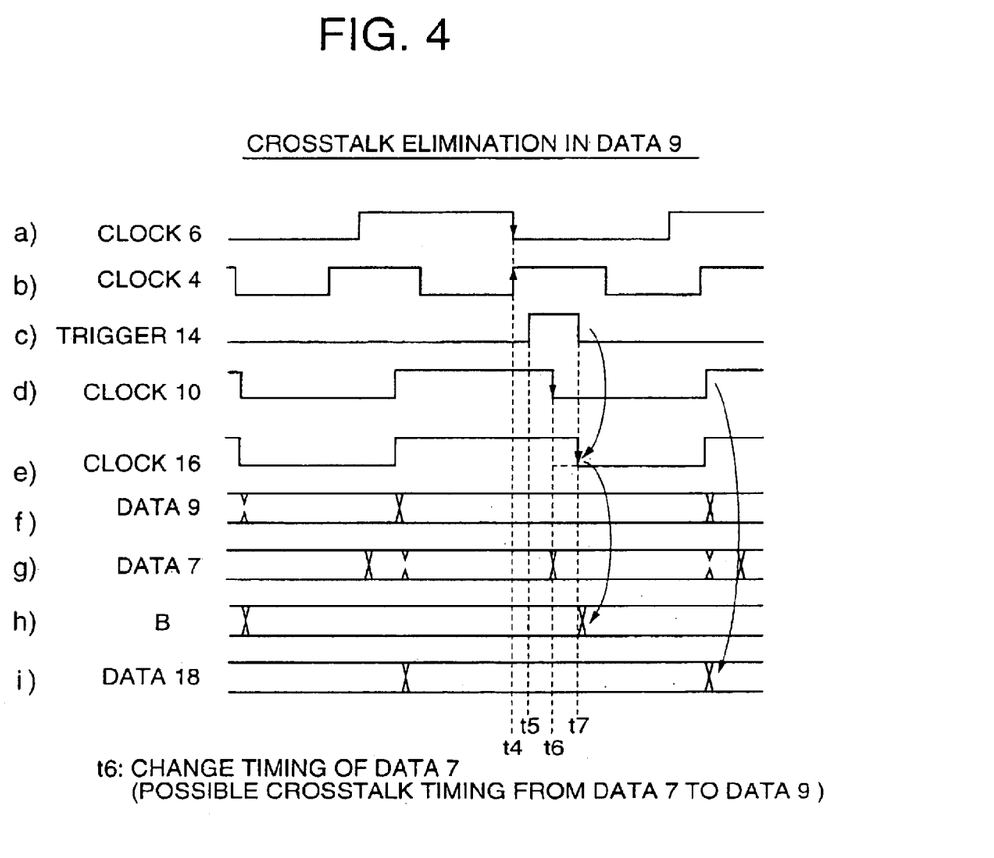
FIG. 4 is a time chart showing a second operation of the embodiment.

Referring to FIG. 4, it is assumed that the clock signal 6 goes low and the clock signal 4 goes high at time instant t4. In this case, if no crosstalk elimination were made, then, at the receiving system 2, the data signal 9 would be read at the trailing edge timing t6 of the clock signal 10. However, the trailing edge timing t6 of the clock signal 10 is also the leading edge timing of the clock signal 8 corresponding to the clock signal 4. Therefore, the data signal 7 would interfere with the data signal 9 at the timing t6.

The crosstalk timing detector 109 of the phase comparator 103 detects possible crosstalk timing from the trailing edge timing 21 of the clock signal 6 detected by the trailing edge detector 106 and the leading edge timing 20 of the clock signal 4 detected by the leading edge detector 105. The crosstalk timing detector 109 outputs the trigger signal 14 having a pulse width (t5–t7) having the trailing edge timing t6 of the clock signal 10 located therein.

At the receiving system 2, the phase shifter 204 receives the clock signal 10 and the trigger signal 14. If the trigger signal 14 is in a logic level of "0", then the received clock signal 10 is supplied as a reading clock signal 16 to the data reading section 206 because no crosstalk occurs. If the trigger signal 14 is in a logic level of "1", which means that crosstalk may occur, then the phase shifter 204 shifts the trailing edge of the clock signal 10 to the trailing edge timing of the trigger signal 14 to produce a reading clock signal 16 as shown in (c) through (e) of FIG. 4. The trailing edge timing of the trigger signal 14 is located before the corresponding data signal changes. Therefore, the reading clock signal 16 produced by the phase shifter 204 always has the timing at which no crosstalk occurs.

The data reading section 206 reads a first data signal indicated by reference symbol "B" from the data signal 9 according to the timing of the reading clock signal 16 as shown (h) of FIG. 4. Thereafter, the data reading section 206 further reads a second data signal 18 from the first data signal B according to the original timing of the clock signal 10 for synchronization with the clock signal 10 as shown in (i) of FIG. 4.

In this manner, crosstalk can be effectively removed from data signals traveling on the cable 301. Therefore, compared with the prior art, a plurality of pairs of data and clock signals can be transmitted through a smaller number of cables.

EXAMPLES

Phase Comparator

An example of the phase comparator 103 will be described with reference to FIGS. 5 and 6.

Figure 5:
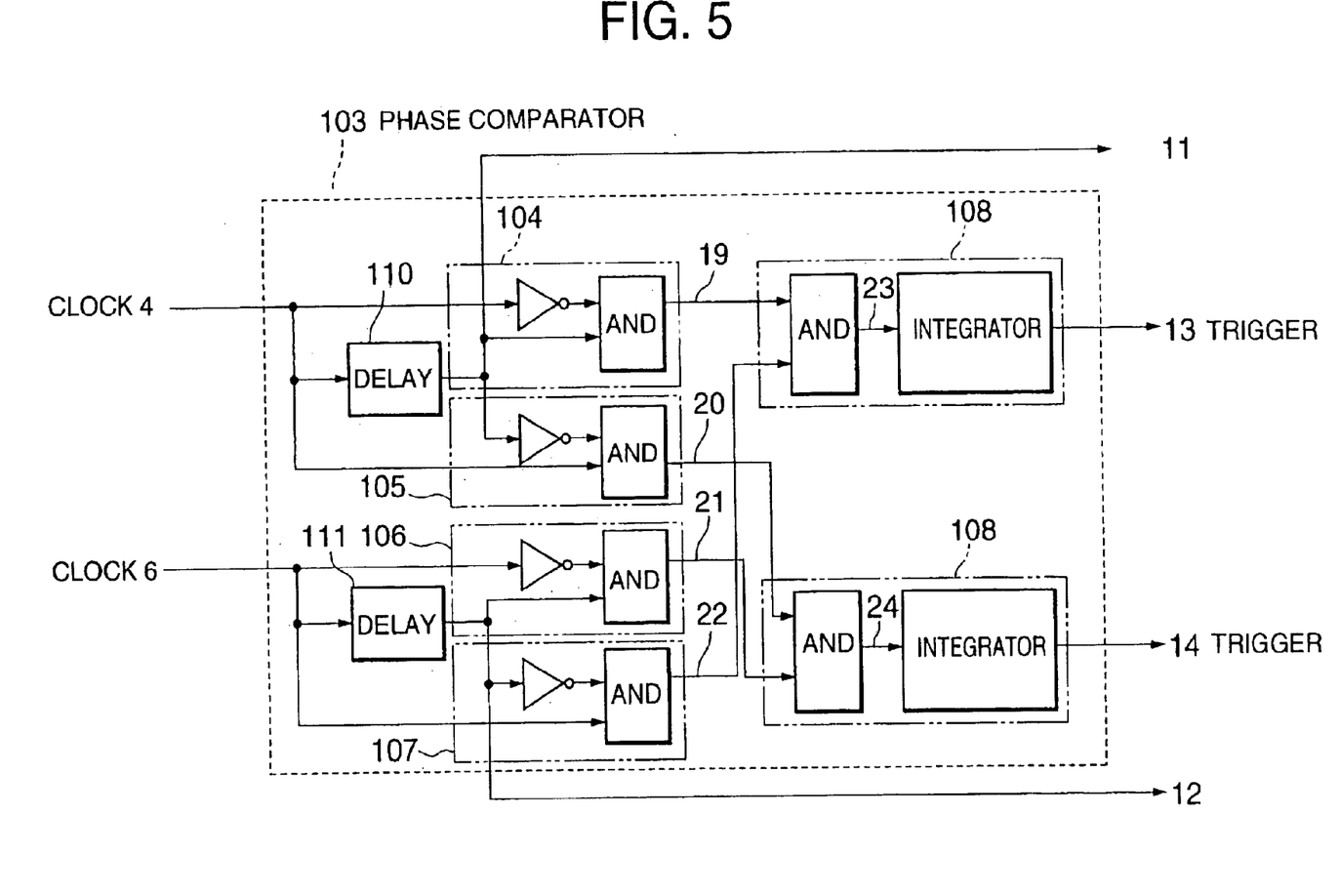
FIG. 5 is a detailed block diagram showing a phase comparator used in the embodiment of FIG. 2.

Referring to FIG. 5, the phase comparator 103, as described in FIG. 2, is provided with the trailing edge detector 104 and the leading edge detector 105, the trailing edge detector 106 and the leading edge detector 107, and the delay circuits 110 and 111.

The trailing edge detector 104 is composed of an inverter and an AND gate that performs a logical AND operation on the delayed clock signal 11 and a clock signal obtained by the inverter logically inverting the clock signal 4 to produce the trailing edge timing signal 19 of the clock signal 4. The leading edge detector 105 is composed of an inverter and an AND gate that performs a logical AND operation on the clock signal 4 and a clock signal obtained by the inverter inverting the delayed clock signal 11 to produce the leading edge timing signal 20 of the clock signal 4.

Similarly, the trailing edge detector 106 is composed of an inverter and an AND gate that performs a logical AND operation on the delayed clock signal 12 and a clock signal obtained by the inverter logically inverting the clock signal 6 to produce the trailing edge timing signal 21 of the clock signal 6. The leading edge detector 107 is composed of an inverter and an AND gate that performs a logical AND operation on the clock signal 6 and a clock signal obtained by the inverter inverting the delayed clock signal 12 to produce the leading edge timing signal 22 of the clock signal 6.

The crosstalk timing detector 108 composed of an AND gate, and an integrator. The AND gate performs a logical AND operation on the trailing edge timing signal 19 and the leading edge timing signal 22 to product an AND output signal 23. The integrator performs integration of the AND output signal 23 to produce the trigger signal 13 having a sufficient pulse width.

The crosstalk timing detector 109 is composed of an AND gate and an integrator. The AND gate performs a logical AND operation on the trailing edge timing signal 21 and the leading edge timing signal 20 to produce an AND output signal 24. The integrator performs integration of the AND output signal 24 to produce the trigger signal 14 having a sufficient pulse width.

Figure 6:
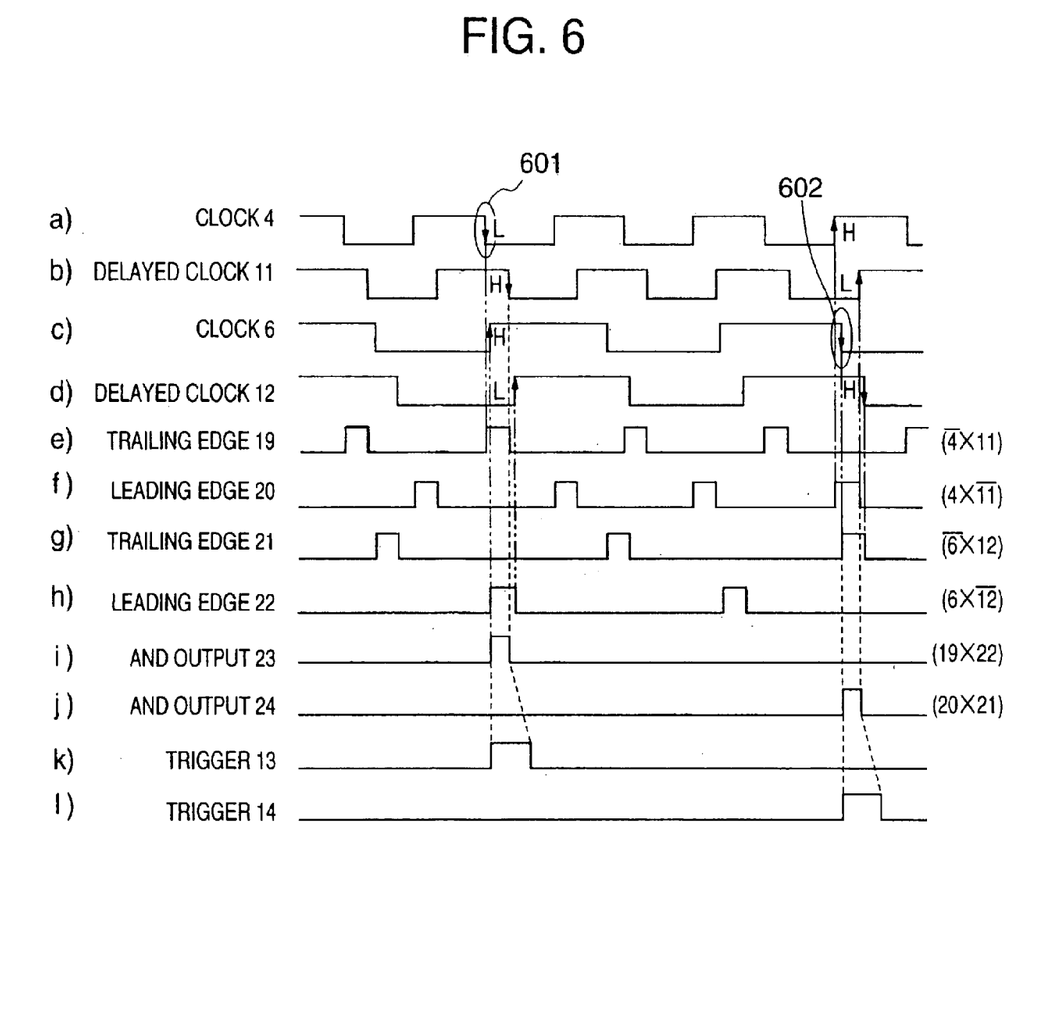
FIG. 6 is a time chart showing an operation of the phase comparator of FIG. 5.

As shown in FIG. 6, a data signal 3 changes in synchronization with the trailing edge timing of its clock signal 4. Therefore, when the clock signal 4 goes low (L) just after the clock signal 6 goes high (H) as indicated by reference numeral 601, crosstalk from the data signal 9 to the data signal 7 is likely to occur. As described before, the crosstalk timing detector 108 detects a possible crosstalk timing (AND output 23) in the data signal 7 to produce the trigger signal 13, which has been widened by the integrator 108 to cover the possible crosstalk timing. Similarly, the crosstalk timing detector 109 detects a possible crosstalk timing (AND output 24) in the data signal 9 to produce the trigger signal 14, which has been widened by the integrator 108 to cover the possible crosstalk timing.

Phase Shifter

Figure 7:
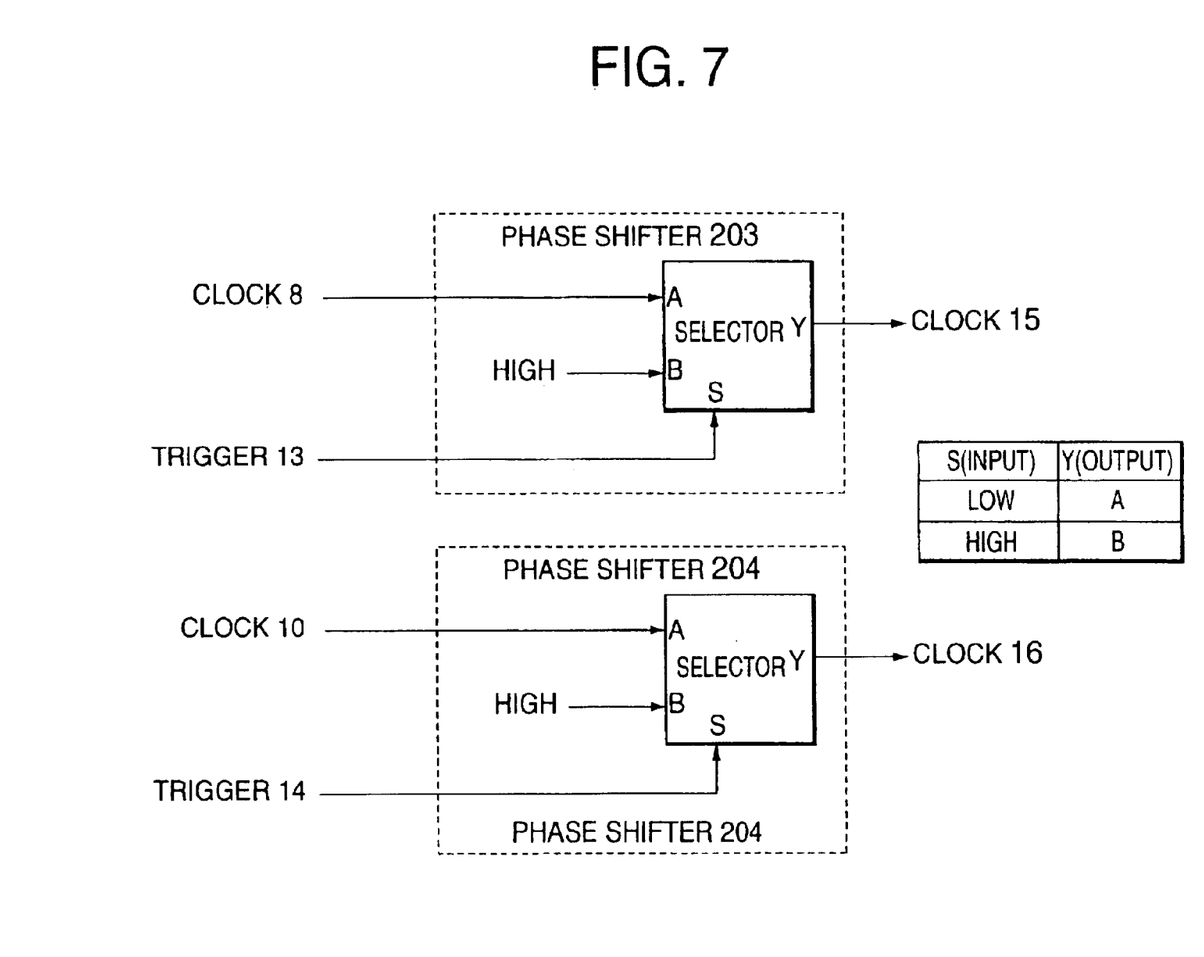
FIG. 7 is a detailed block diagram showing phase shifters used in the embodiment of FIG. 2.

In the receiving system 2, as described before, the phase shifter 203 receives the clock signal 8 and the trigger signal 13 indicating the timing of possible crosstalk from the data signal 9 to the data signal 7. Similarly, the phase shifter 204 receives the clock signal 10 and the trigger signal 14 indicating the timing of possible crosstalk from the data signal 7 to the data signal 9.

Referring to FIG. 7, each of the phase shifters 203 and 204 is composed of a selector, which selects one of inputs A and B depending on a selection signal S and outputs a selected one as a reading clock signal.

The selector of the phase shifter 203 inputs the clock signal 8 as input A, a fixed signal being a logic state of 1 (high) as input B and the trigger signal 13 as the selection signal S. When the trigger signal 13 is a level of 0 (low), the selector selects the clock signal 8 to output it as the reading clock signal 15. When the trigger signal 13 is a level of 1 (high), the selector selects the fixed signal being a logic state of 1 (high) to output it as the reading clock signal 15.

Similarly, the selector of the phase shifter 204 inputs the clock signal 10 as input A, a fixed signal being a logic state of 1 (high) as input B and the trigger signal 14 as the selection signal S. When the trigger signal 14 is a level of 0 (low), the selector selects the clock signal 10 to output it as the reading clock signal 16. When the trigger signal 14 is a level of 1 (high), the selector selects the fixed signal being a logic state of 1 (high) to output it as the reading clock signal 16.

Figure 8:
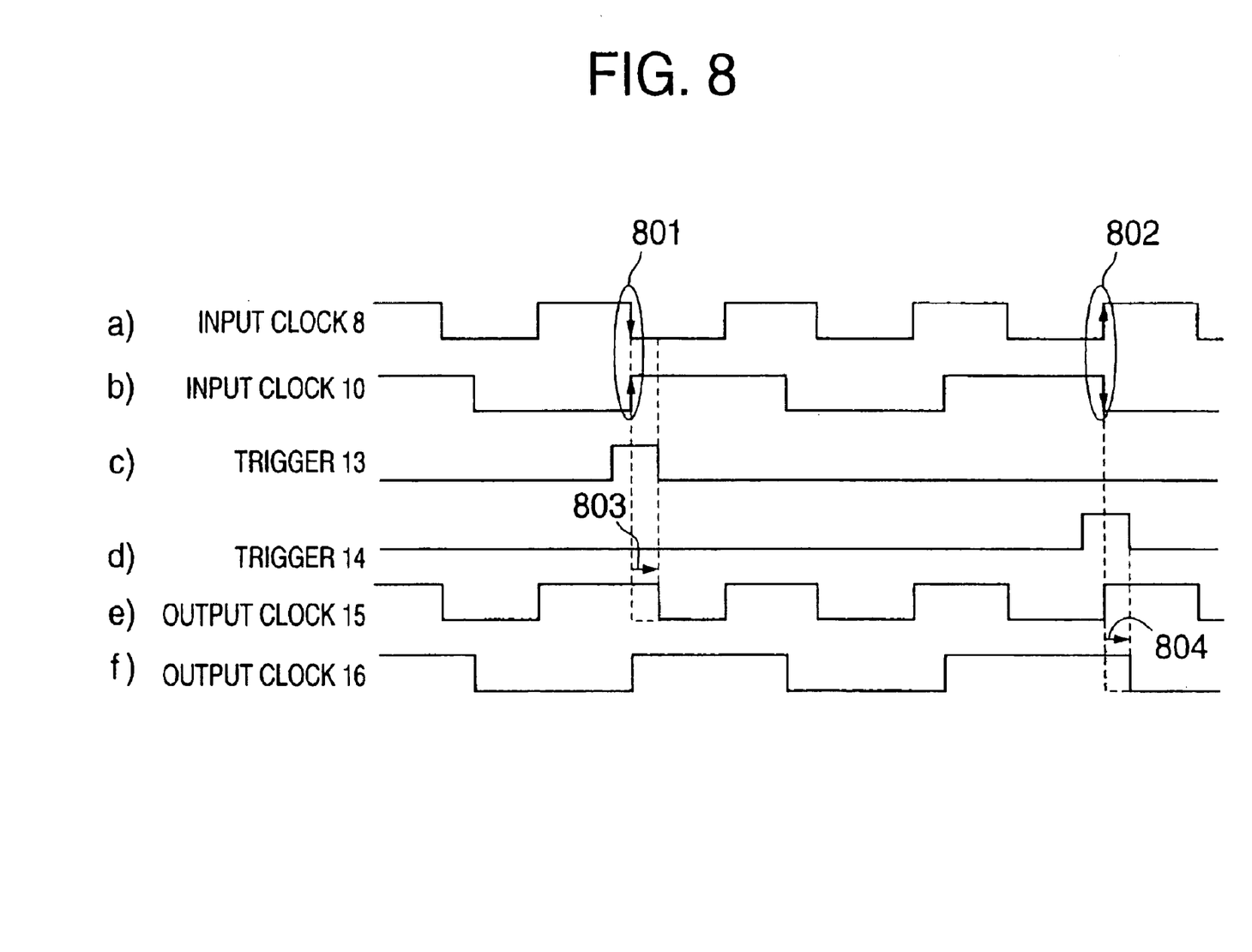
FIG. 8 is a time chart showing an operation of the phase shifters of FIG. 7.

As shown in FIG. 8, when the clock signal 8 goes low (L) and the clock signal 10 goes high (H), as indicated by reference numeral 801, crosstalk from the data signal 9 to the data signal 7 is likely to occur. Therefore, the crosstalk timing detector 108 produces the trigger signal 13 having a pulse width during which the possible crosstalk timing 801 is included and outputs it to the receiving system 2 as shown in (c) of FIG. 8.

The phase shifter 203 receives the clock signal 8 and the trigger signal 13 from the sending system 1. If the trigger signal 13 is in a low level "0", then the phase shifter 203 selects the received clock signal 8 as a reading clock signal 15 to the data reading section 205 because no crosstalk occurs. However, if the trigger signal 13 is in a high level "1", then the phase shifter 203 selects the fixed signal being the logic state of High to shift the trailing edge of the clock signal 8 to the trailing edge timing of the trigger signal 13 to produce the reading clock signal 15 as shown in (e) of FIG. 8. Therefore, the reading clock signal 16 produced by the phase shifter 204 always has the reading timing at which no crosstalk occurs. It is the same with the phase shifter 204.

Data Reading Section

Figure 9:
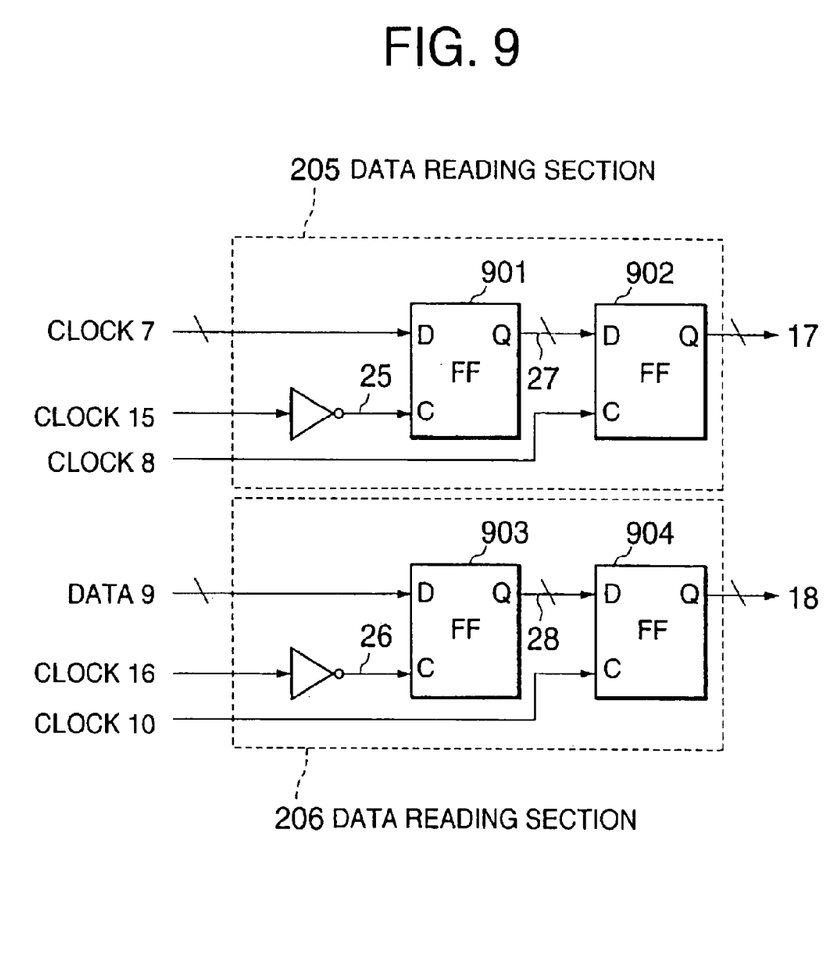
FIG. 9 is a detailed block diagram showing data reading sections used in the embodiment of FIG. 2.

Referring to FIG. 9, the data reading section 205 is composed of a first flip-flop circuit 901 and a second flip-flop circuit 902. The first flip-flop circuit 901 inputs the data signal 7 at the input D and an clock signal 25 generated by an inverter inverting the reading clock signal 15. The second flip-flop circuit 902 inputs the output 27 of the first flip-flop circuit 901 and the clock signal 8.

Similarly, the data reading section 206 is composed of a first flip-flop circuit 903 and a second flip-flop circuit 904. The first flip-flop circuit 903 inputs the data signal 9 at the input D and an clock signal 26 generated by an inverter inverting the reading clock signal 16. The second flip-flop circuit 904 inputs the output 28 of the first flip-flop circuit 903 and the clock signal 10.

Figure 10A:
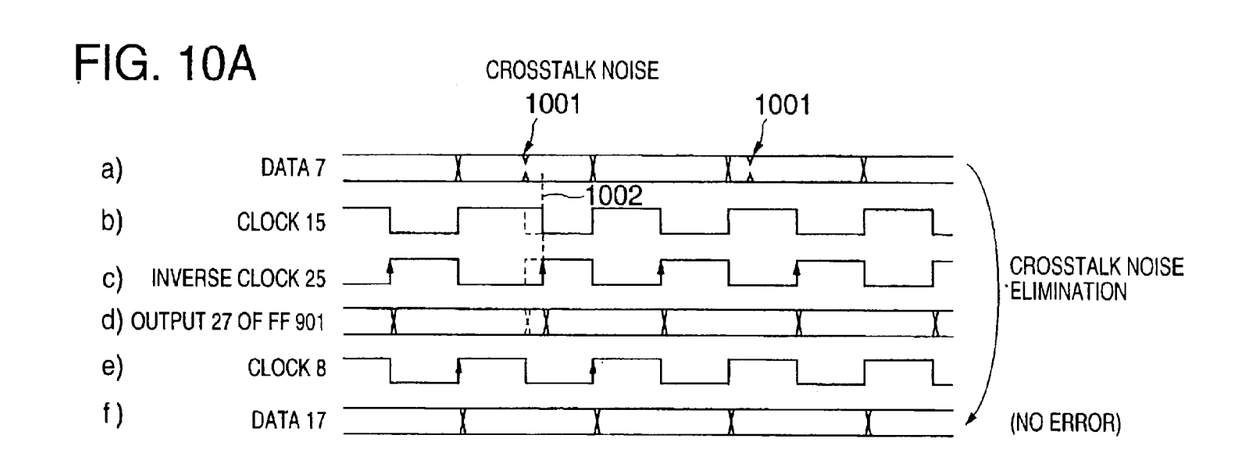
FIGS. 10A and 10B are time charts showing respective operations of the data reading sections of FIG. 7.

As shown in FIG. 10A, the first flip-flop circuit 901 of the data reading section 205 reads a first data signal 27 from the data signal 7 according to the reading clock signal 15. More specifically, even if a crosstalk noise 1001 is generated by the data signal 9, the reading clock signal 15 has the trailing edge timing 1002 at which no crosstalk could be generated. Therefore, the first data signal 27 has no crosstalk noise. However, the first data signal 27 is not synchronized with the original clock signal 8.

Thereafter, the second flip-flop circuit 902 further reads a second data signal 17 from the first data signal 27 according to the clock signal 8 for synchronization with the clock signal 8. In this way, the data signal 17 having no error can be output to the data processor 201.

Figure 10B:
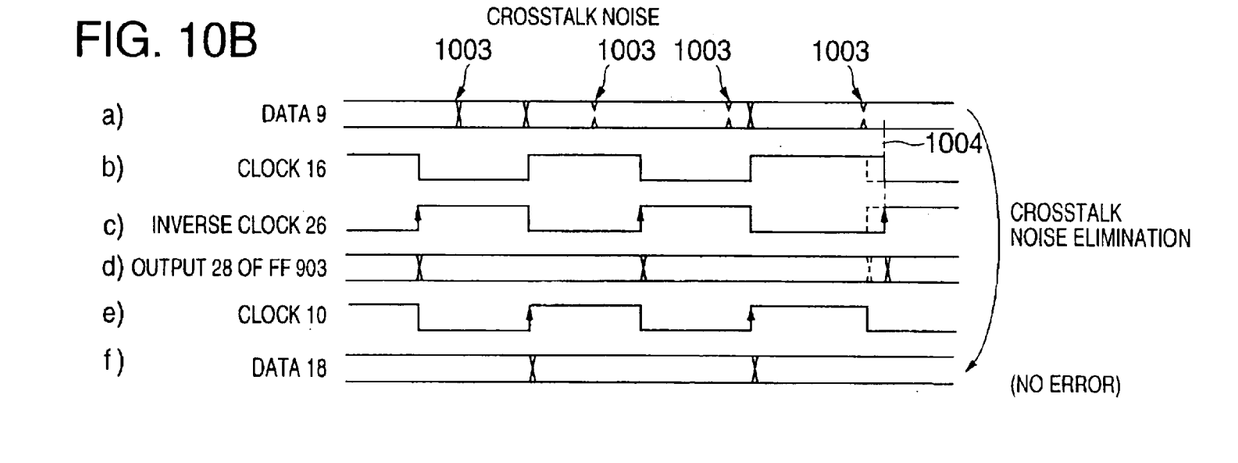

As shown in FIG. 10B, the first flip-flop circuit 903 of the data reading section 296 reads a first data signal 28 from the data signal 9 according to the reading clock signal 16. More specifically, even if a crosstalk noise 1003 is generated by the data signal 7, the reading clock signal 16 has the trailing edge timing 1004 at which no crosstalk could be generated Therefore, the first data signal 28 has no crosstalk noise. However, the first data signal 28 is not synchronized with the original clock signal 10.

Thereafter, the second flip-flop circuit 904 further reads a second data signal 18 from the first data signal 28 according to the clock signal 10 for synchronization with the clock signal 10. In this way, the data signal 18 having no error can be output to the data processor 202.

In the above embodiment, the case of two pairs of data and clock signals is described. However, it is apparent that the present invention can be applied to three or more pairs of data and clock signals.

It is contemplated that numerous modifications may be made to the embodiments and implementations of the present invention without departing from the spirit and scope of the invention as defined in the following claims.

What is claimed is:

1. A system for eliminating crosstalk among a plurality of data signals traveling from sending equipment to receiving equipment through a transmission cable, wherein clock signals each associated with the data signals are not synchronized with each other, wherein the sending equipment comprises:
   a detector for detecting a possible crosstalk timing in each of the data signals by comparing phases of the clock signals to transmit the possible crosstalk timing to the receiving equipment, and
the receiving equipment comprises:
   a read timing shifter for shifting a read timing of each of the clock signals associated with a corresponding data signal to a no-crosstalk timing determined based on the possible crosstalk timing.

2. The system according to claim 1, wherein the detector comprises:
   a leading edge detector for detecting a leading edge timing of each of the clock signals;
   a trailing edge detector for detecting a trailing edge timing of the clock signal; and
   a crosstalk timing detector for detecting the possible crosstalk timing in a corresponding data signal based on the trailing edge timing of the clock signal associated with it and leading edge timings of all clock signals other than the clock signal.

3. The system according to claim 1, wherein the receiving equipment further comprises:
   a first data reading section for reading each of the data signals received from the sending equipment according to the no-crosstalk timing to produce a first data signal; and a second data reading section for reading the first data signal according to the read timing of a corresponding clock signal.

4. A system for eliminating crosstalk among a plurality of data signals traveling from sending equipment to receiving equipment through a transmission cable, wherein clock signals each associated with the data signals are not synchronized with each other, wherein the sending equipment comprises:
  a phase comparator for comparing phases of the clock signals to produce a phase shift trigger signal indicating a possible crosstalk timing for each of the data signals, to transmit the phase shift trigger signal to the receiving equipment;
the receiving equipment comprises:
  a read timing shifter for receiving the phase shift trigger signal and a corresponding clock signal and shifting a read timing of the corresponding clock signal depending on the phase shift trigger signal to produce a shifted read timing signal; and
  a data reading section for receiving the data signal, the corresponding clock signal, and the shifted read timing signal, and reading the data signal according to the shifter read timing signal to produce a first data signal and thereafter reading the first data signal according to the corresponding clock signal to produce a final data signal.

5. The system according to claim 4, wherein the phase comparator comprises:
  a leading edge detector for detecting a leading edge timing of each of the clock signals;
  a trailing edge detector for detecting a trailing edge timing of the clock signal;
  a crosstalk timing detector for detecting the possible crosstalk timing in a corresponding data signal based on the trailing edge timing of the clock signal associated with it and leading edge timings of all clock signals other than the clock signal; and
  a trigger generator for generating the phase shift trigger signal from the possible crosstalk timing, wherein the phase shift trigger signal has a pulse width having the possible crosstalk timing located therein.

6. The system according to claim 4, wherein the read timing shifter comprises a selector for selecting one of the corresponding clock signal and a fixed signal being a logic high level depending on the phase shift trigger signal, wherein the corresponding clock signal is selected when the phase shift trigger signal is a logic low level and the fixed signal is selected when the phase shift trigger signal is a logic high level.

7. The system according to claim 6, wherein the data reading section comprises:
  a first flip-flop circuit for reading the data signal according to the shifted read timing signal to produce the first data signal; and
  a second flip-flop circuit for reading the first data signal according to the corresponding clock signal.

8. A method for eliminating crosstalk among a plurality of data signals traveling from sending equipment to receiving equipment through a transmission cable, wherein clock signals each associated with the data signals are not synchronized with each other, comprising the steps of:

at the sending equipment,
  a) detecting a possible crosstalk timing in each of the data signals by comparing phases of the clock signals to transmit the possible crosstalk timing to the receiving equipment; and
at the receiving equipment,
  b) shifting a read timing of each of the clock signals associated with a corresponding data signal to a no-crosstalk timing determined based on the possible crosstalk timing.

9. The method according to claim 8, wherein the step (a) comprises the steps of:
  detecting a leading edge timing of each of the clock signals;
  detecting a trailing edge timing of the clock signal; and
  detecting the possible crosstalk timing in a corresponding data signal based on the trailing edge timing of the clock signal associated with it and leading edge timings of all clock signals other than the clock signal.

10. The method according to claim 8, further comprising the steps of:
at the receiving equipment,
  c) reading each of the data signals received from the sending equipment according to the no-crosstalk timing to produce a first data signal; and
  d) reading the first data signal according to the read timing of a corresponding clock signal.

11. A method for eliminating crosstalk among a plurality of data signals traveling from sending equipment to receiving equipment through a transmission cable, wherein clock signals each associated with the data signals are not synchronized with each other, the method comprising the steps of:

at the sending equipment,
  comparing phases of the clock signals to produce a phase shift trigger signal indicating a possible crosstalk timing for each of the data signals, to transmit the phase shift trigger signal to the receiving equipment;
at the receiving equipment,
  receiving the phase shift trigger signal and a corresponding clock signal;
  shifting a read timing of the corresponding clock signal depending on the phase shift trigger signal to produce a shifted read timing signal;
  reading the data signal according to the shifter read timing signal to produce a first data signal; and
  reading the first data signal according to the corresponding clock signal to produce a final data signal.

* * * * *